United States Patent [19]
Van Zeijl et al.

[11] Patent Number: 5,802,458
[45] Date of Patent: Sep. 1, 1998

[54] DEVICE AND ANTENNA FOR CORDLESS RADIO COMMUNICATION INCLUDING RADIO SIGNAL ATTENUATION MECHANISM

[75] Inventors: Paulus Thomas M. Van Zeijl, Hengelo; Johannis Van Bruggen, Enschede, both of Netherlands

[73] Assignee: Telefoanktiebolaget LM Ericsson, Stockholm, Sweden

[21] Appl. No.: 591,559

[22] PCT Filed: Jul. 11, 1994

[86] PCT No.: PCT/NL94/00158

§ 371 Date: Jan. 11, 1996

§ 102(e) Date: Jan. 11, 1996

[87] PCT Pub. No.: WO95/02284

PCT Pub. Date: Jan. 19, 1995

[30] Foreign Application Priority Data

Jul. 9, 1993 [EP] European Pat. Off. ............ 93202040
Dec. 15, 1993 [NL] Netherlands ................ 9302192

[51] Int. Cl.$^6$ ................................................. H04B 1/03
[52] U.S. Cl. ................ 455/90; 455/129; 455/347; 455/351; 455/575; 455/117; 343/702; 343/752; 343/848
[58] Field of Search ................ 455/89, 90, 128, 455/129, 347, 351, 550, 562, 575, 117; 343/702, 700 MS, 848, 829, 752

[56] References Cited

U.S. PATENT DOCUMENTS

| | | | |
|---|---|---|---|
| 3,521,169 | 7/1970 | Turner et al. | 343/752 |
| 4,207,574 | 6/1980 | Toia | 343/752 |
| 5,231,407 | 7/1993 | McGirr | 343/700 MS |
| 5,335,366 | 8/1994 | Daniels | 455/89 |
| 5,373,304 | 12/1994 | Nolan et al. | 455/89 X |
| 5,444,866 | 8/1995 | Cykiert | 455/90 X |
| 5,507,012 | 4/1996 | Luxon et al. | 455/89 |

FOREIGN PATENT DOCUMENTS

| | | |
|---|---|---|
| 0532960A1 | 3/1993 | European Pat. Off. . |
| 0588271A1 | 3/1994 | European Pat. Off. . |

*Primary Examiner*—Nguyen Vo
*Assistant Examiner*—Philip J. Sobutka
*Attorney, Agent, or Firm*—Burns, Doane, Swecker & Mathis, L.L.P.

[57] ABSTRACT

A radiocommunication device wherein a signal pattern generated from an antenna is attenuated in a direction of a user of the device. A conducting surface is positioned proximate the antenna at a location designed to provide this attenuation.

10 Claims, 5 Drawing Sheets

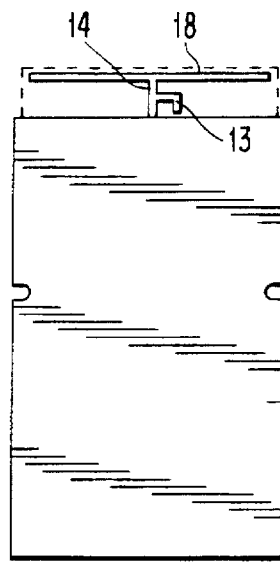 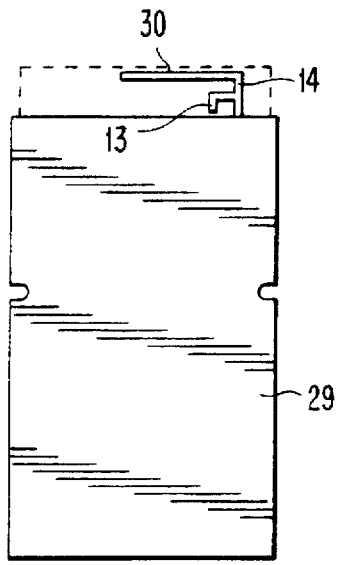 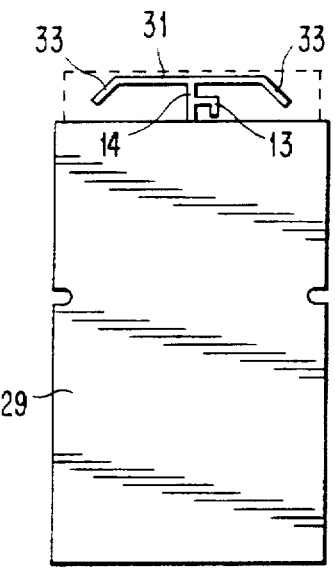
FIG. 7  FIG. 8  FIG. 9
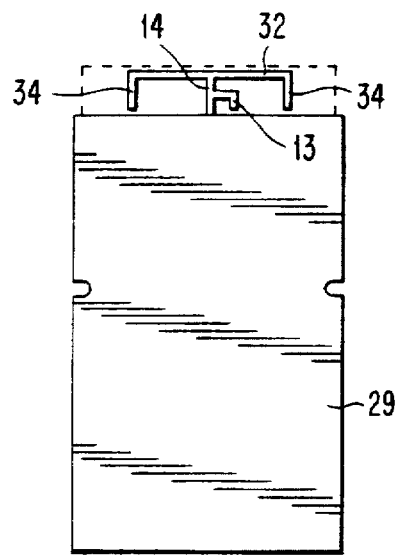 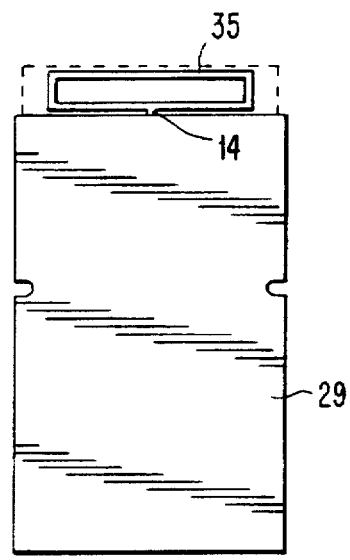
FIG. 10  FIG. 11

DEVICE AND ANTENNA FOR CORDLESS RADIO COMMUNICATION INCLUDING RADIO SIGNAL ATTENUATION MECHANISM

TECHNICAL FIELD OF THE INVENTION

The invention relates to devices for cordless radio communication, in particular portable cordless telephones, in addition to an antenna structure suitable for use in these devices.

BACKGROUND OF THE INVENTION

Cordless telephones, walkie-talkies, personal paging equipment (called "radio pagers" in English language professional literature) and combinations thereof are examples of devices for cordless radio communication with antennas which have to have a preferably omni-directional receiving or radiating pattern in order to realize the best possible, direction-independent reception and/or transmission of radio signals. During use, however, a part of the electromagnetic energy generated by the antenna means will also be emitted in the direction of the user.

In a device for cordless radio communication embodied for instance as portable telephone which comprises information exchanging means for picking up and reproducing audio signals, which means are accessible to a user from one side of the housing in the manner of a telephone receiver, the user will hold the telephone with said side against or close to his head. However, the electromagnetic shielding caused by the head results in an effective decrease of the electromagnetic energy generated by the antenna in the direction of the head as well as a reduced sensitivity to radio reception in this direction.

European patent application 0.532.960 discloses a portable cordless telephone provided with an extending rod antenna having an active part for receiving and transmitting radio-frequent radiation which extends mutually in line with a non-active part. During use the active part protrudes above the head of the user. In this manner an undesired influencing of the antenna properties by the body of the user is prevented as far as possible. The amount of electromagnetic energy striking against the body of the user or a part thereof is also reduced in this manner.

The Japanese patent application 4.220.851 discloses the use of electromagnetic shielding means on the side of a portable cordless telephone directed toward the user during use, this to limit as far as possible the amount of electromagnetic energy radiated in the direction of the head of the user.

SUMMARY OF THE INVENTION

The basic objective of the invention is to provide a device for cordless radio communication, wherein steps are taken aimed at reducing the influence of the body of a user, a part of the body, on the electromagnetic energy effectively transmitted and/or received by the antenna means.

The invention also has for its object to reduce the mount of electromagnetic radiation to which the body of the ser is exposed during use of a device for cordless radio communication suitable for transmitting radio signals.

A further objective of the invention is to provide a suitable antenna construction for use in a device for cordless radio communication, particularly in combination th the said steps for reducing the influence of the body of e user on the transmitting and/or receiving properties of the device.

The invention is based on the insight that it is of no practical value to design the antenna means such that during use they generate electromagnetic energy in a direction shielded by the body of the user or a part thereof and/or are sensitive to reception of radio-frequent radiation from this direction. In its most general form the invention involves providing a device for cordless radio communication provided with antenna means having an asymmetrical directional pattern which has an attenuation in the direction of the side from which the means for information exchange are accessible to the user.

In a practical realization the invention provides a device for cordless radio communication provided with a housing, means for information exchange accommodated in the housing and accessible to the user from one side thereof, signal processing means coupled to the means for information exchange and radio transmission means coupled to the signal processing means and provided with antenna means. The antenna means comprise at least one electrically conducting element for receiving and/or transmitting radio signals and an electrically conducting surface which is disposed in the vicinity of the conducting element and interacts therewith and which is connected to common electrical mass means of the device, wherein the conducting surface has a position and form suitably chosen in relation to the conducting element in order to provide an antenna directional pattern with an attenuation in the direction of the said side of the housing.

In order to realize a desired antenna directional pattern use is advantageously made in this embodiment of the invention of the electrically conducting surface which interacts with the conductor for receiving and/or transmitting and which is essential to the operation of the antenna. The required attenuation in the antenna directional pattern is obtained by a suitably chosen position and/or design of the conducting surface in relation to the relevant conductor and an amplification of the transmitted electromagnetic energy and an increase in the sensitivity of the antenna for radio reception in a desired direction can also be achieved.

It is noted that the non-prepublished European patent application 0.588.271 likewise describes the use of an antenna construction with an asymmetrical directional pattern in a portable device for cordless radio communication. Different from the present invention this is realized by the use of additional elements such as shielding means or reflectors disposed adjacently of the antenna or the use of per se known antenna structures with directional properties which are comparatively bulky in size.

Specifically in the case of equipment of hand dimensions the use of such antenna structures is not always possible or desirable, particularly not when the antenna must be accommodated in the housing of the apparatus in question. In general in such situations there is also insufficient space available for additional shielding means for the antenna.

In an antenna construction particularly suitable for use in the device according to the invention the said conducting element comprises a first electrical conductor with an end provided with a terminal for connection to electrical mass means of the device and with another end connected to a second electrical conductor, which second conductor extends substantially transversely of the first conductor, wherein the first conductor is provided in the region between the said ends with a terminal for connection to radio transmission means of the device.

This antenna construction, in particular the embodiment according to the invention wherein the first and second conductor form part of a printed circuit board, is advantageously suitable for fixed mounting in a device for cordless radio communication. Such an antenna construction enables mass production in simple and relatively inexpensive manner.

The conductors can be formed in a manner suitable to realize a desired antenna directional pattern and/or resonance frequency. Embodiments which have been found particularly suitable are those wherein the second conductor has an elongate form with ends running for instance at an angle of 45° or 90° relative to its lengthwise direction, so that in combination with the first conductor a generally T-shape results. The second conductor can also have a wholly or partially closed contour with for instance an O- or C-form. Yet another arrangement of both conductors consists of a generally L-shape.

It is noted that the electrically conducting surface referred to in the foregoing and interacting with the conducting element of the antenna does not necessarily have to be a surface in the form of a plate or the like. Component shielding means present in the device, such as for instance electrically conducting housings of coils and the like connected to the mass means of the device, can also function as conducting surface in the sense of the present invention. Positioning of the conducting surface substantially on one side of the conducting element, for example on one side transversely of a printed circuit board on which the said conducting element is formed, already results in certain antenna directional properties.

In a preferred embodiment of the device according to the invention the conducting surface has a substantially flat form and an inclining position relative to the said side of the housing of the device corresponding with the desired antenna directivity pattern. Such a surface can with advantage integrally form part of an electrically conducting shielding wholly or partially enclosing at least the radio transmission means.

The invention is illustrated hereinbelow with reference to an application in a cordless portable telephone as illustrated in the annexed drawings.

BRIEF DESCRIPTION OF THE DRAWINGS

FIG. 7–11 show schematic views of embodiments of antenna elements according to the invention.

DETAILED DESCRIPTION OF EMBODIMENTS

Figure 1:
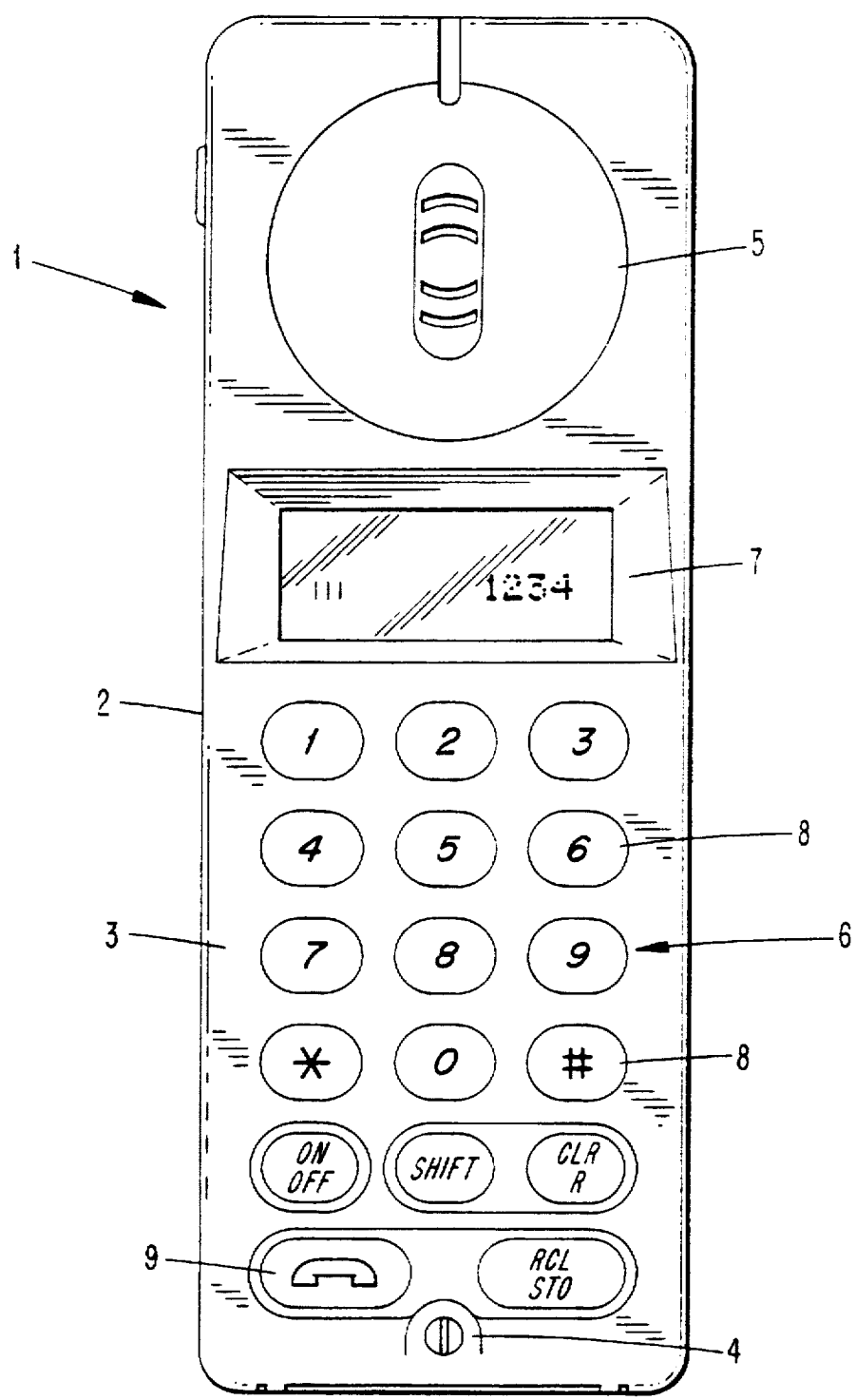
FIG. 1 shows a schematic view of a portable cordless telephone provided with an antenna according to the invention.

FIG. 1 shows a schematic front view of a portable cordless telephone 1. Telephone 1 comprises a housing 2 ving means for information exchange accessible to the user om one side 3 in the form of a microphone part 4 and a udspeaker part 5 for picking up respectively reproducing audio signals, in particular speech signals. The microphone and loudspeaker part 4, 5 are disposed on the side 3 in the manner of a telephone handset.

Situated between said parts 4, 5 is a keypad 6 and display means 7. Keypad 6 comprises the twelve number and control keys 8 typical for telephone handsets in addition to several supplementary function keys including a hook signalling key 9. On the display means 7 are shown inter alia the chosen number and other data required for use of the telephone. The telephone, can be held in the hand, wherein during use the side 3 is directed toward the head of the user. The latter can thus speak into the microphone and listen with one ear to the sound reproduced by the loudspeaker.

Figure 2:
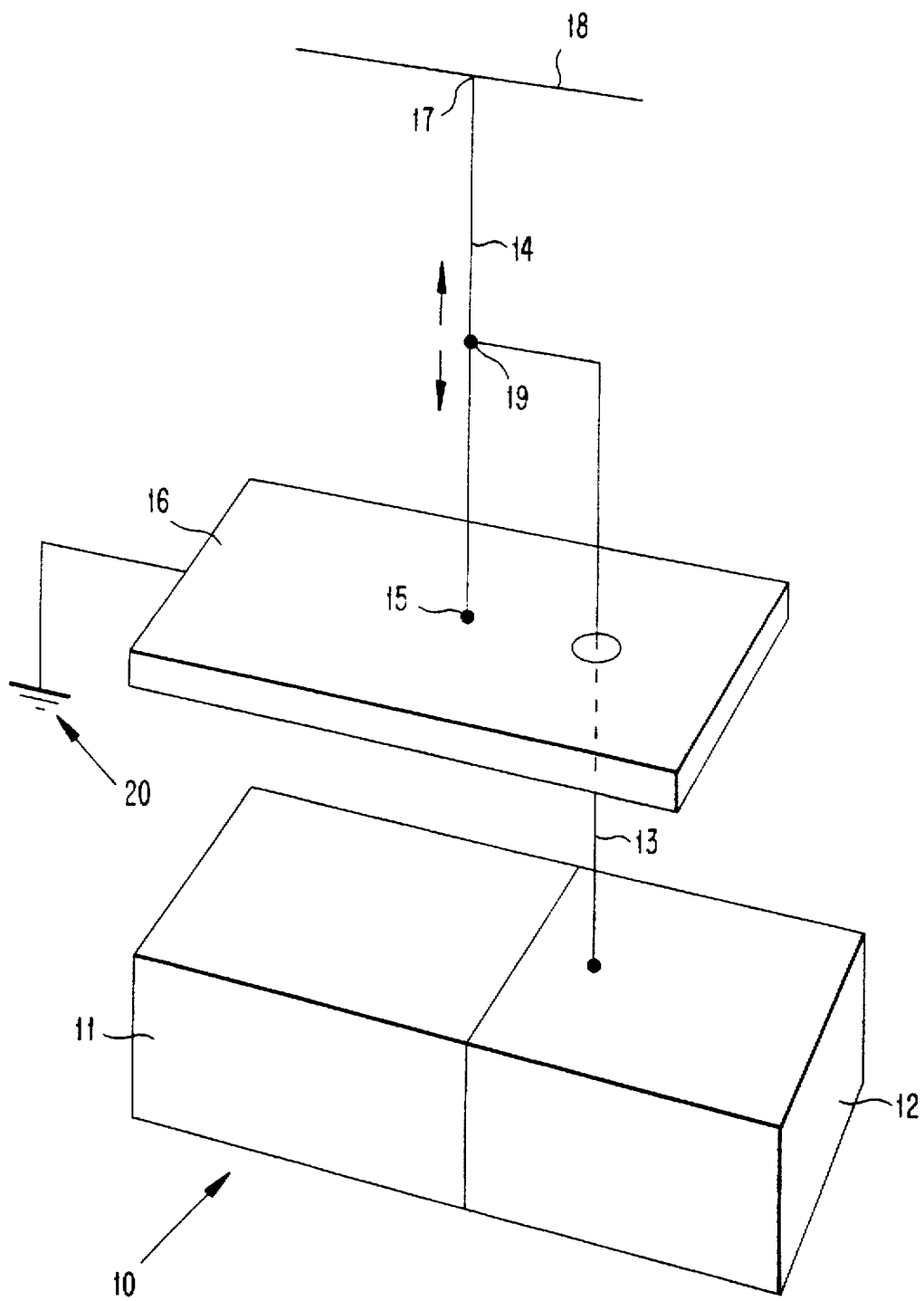
FIG. 2 shows highly schematically and in perspective an exploded view of parts of a cordless telephone with an antenna construction according to the invention.

FIG. 2 shows a highly schematic perspective view of a part of a cordless telephone. Shown is an electronic unit 10 which comprises signal processing means 11 and radio transmission means 12. A transmitter and receiver generally form part of the radio transmission means 12. Signal processing means 11 comprise means for processing the signals of the several keys 8, 9 and of the telephone system to which the telephone 1 connects, in addition to means such as drivers for actuating the display means 7 and amplifiers and the like for the microphone and loudspeaker 4, 5 as shown in FIG. 1.

The radio transmission means 12 are connected via an antenna signal conductor 13 to an electrically conducting element of the antenna for receiving and/or transmitting radio signals. This element consists of an elongate first electrical conductor 14 and an elongate second electrical conductor 18 extending substantially transversely thereof. The first conductor 14 is electrically connected to the second conductor 18 with an end 17. A further end 15 of the first conductor 14 is connected to an electrically conducting surface 16, which surface 16 forms with the first and second conductor 14, 18 the complete antenna.

The conducting surface 16, which is shown in the form of a plate, is connected to common electrical mass means 20 of the telephone 1, these being symbolically designated with three horizontal lines. The antenna signal conductor 13 is electrically connected to the first conductor 14 at a point 19 in the region between both ends 15, 17 of the first conductor 14. The location of the point 19 contributes toward determining the electrical impedance of the antenna, as seen from the antenna signal conductor 13.

Figure 3:
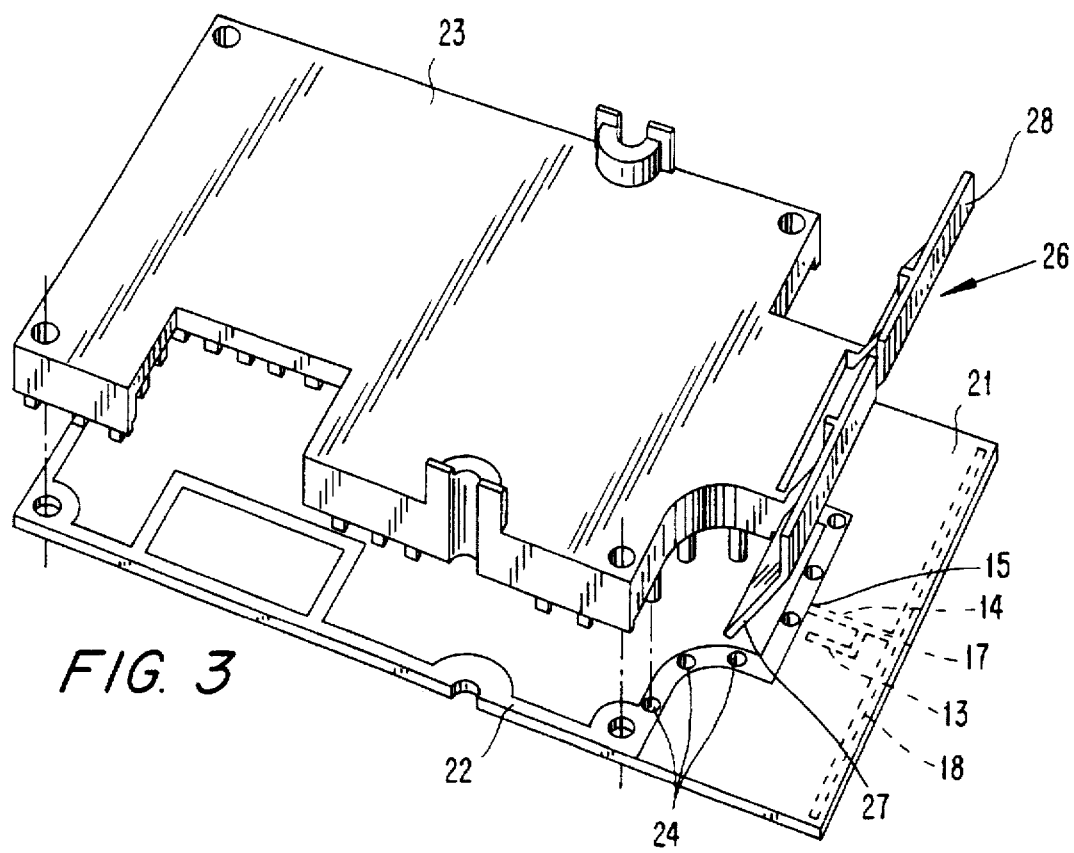
FIG. 3 shows schematically and in perspective an exploded view of an antenna construction with directional properties according to a preferred embodiment of the invention.

FIG. 3 shows a further embodiment of the antenna according to the invention as applied in the cordless telephone 1 shown in FIG. 1. The several conductors 13, 14, 18 are formed as electrically conducting tracks on a board 21 with printed circuitry. Such boards are generally called "Printed Circuit Boards (PCB)" in the English-language professional literature. The end 15 of the first conductor 14 is connected to an electrically conducting contour 22 arranged on the PCB 21, which contour 22 forms part of the common mass means 20 of telephone 1. Situated on PCB 21 inside this contour 22 is a printed circuit (not shown) for mounting electronic components including for instance the radio transmission means 12.

An electrically conducting shielding 23 in the form of a box open on one side is electrically connected, for example by soldering, to the conducting contour 22 which can extend on the other side of PCB 21 as a conducting surface. The shielding 23 thus electromagnetically shields from the outside world the thereby enclosed electronic components.

Shielding 23 further carries an elongate electrically conducting plate 26 which is formed integrally with the shielding and which in the mounted situation is therefore connected to the mass means 20.

The conducting plate 26, which in the mounted situation of the shielding 23 extends in lengthwise direction of the second conductor 18 and on only one side of PCB 21, comprises a first part 27, which assumes an inclining position relative to the surface of PCB 21, and a second part 28 which extends substantially transversely of PCB 21, as shown. In the assembled situation the shielding 23 adjoins the side 3 of telephone 1 shown in FIG. 1. The conducting plate 26 forms the conducting surface of the antenna and brings about an antenna operation with a directional pattern which has an effective attenuation in the direction of the said side 3 of telephone 1.

Figure 5:
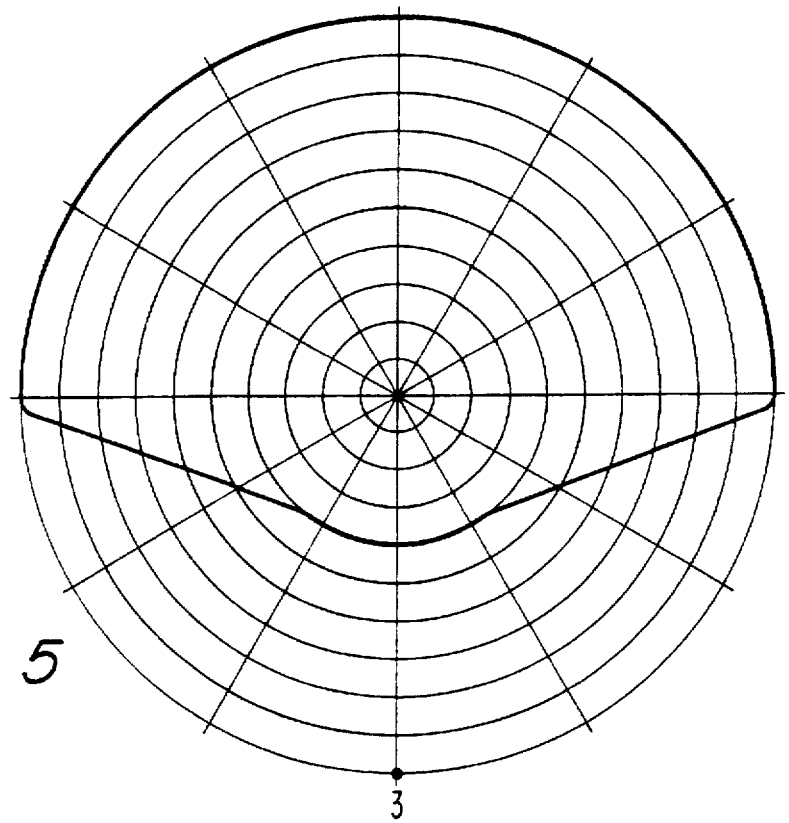
FIG. 5 shows schematically a desired antenna directional pattern for a portable cordless telephone according to the invention.

In this respect reference is now made to FIG. 5. Shown herein is a desired antenna directional pattern, wherein the distance between the circles corresponds to a level difference of 1 dB. The side of telephone 1 which is directed toward the head of the user during use is situated at the bottom of the diagram, as illustrated symbolically with the reference numeral 3. It will be apparent that the radiation intensity and the reception sensitivity is maximal in the main direction of the antenna remote from the side 3, while in the direction toward the side 3 an attenuation in the order of magnitude of 6 dB has occurred.

Figure 6:
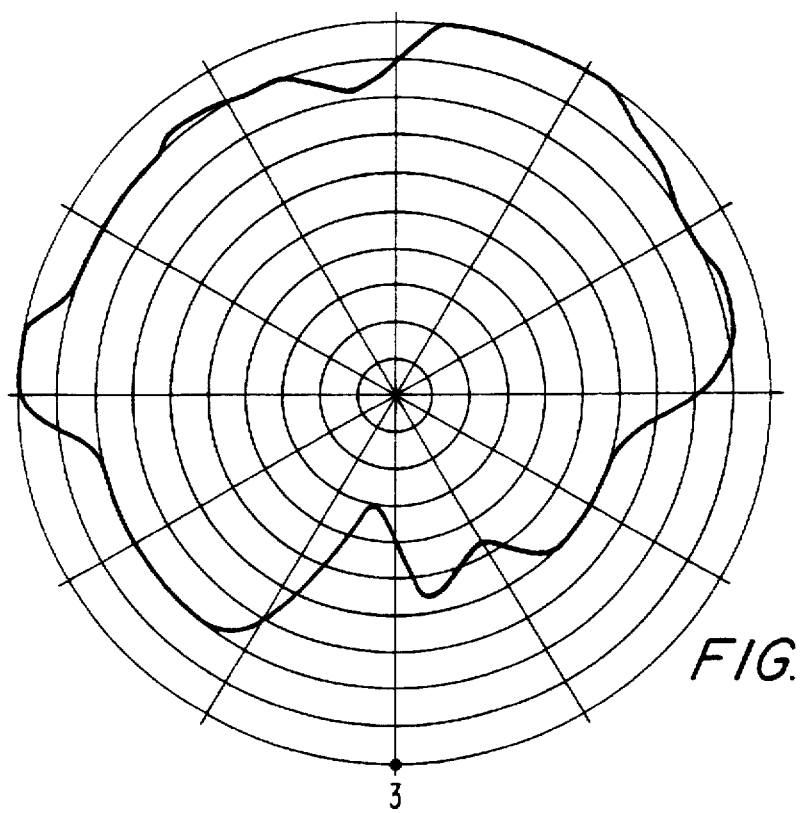
FIG. 6 shows schematically a measured antenna directional pattern for the antenna construction according to the invention as shown in FIG. 3.

FIG. 6 shows on the same scale as FIG. 5 a measured antenna directional pattern for the configuration shown in FIG. 3. Because both patterns are only intended to illustrate intensity ratios no quantities and/or units are shown herein.

Figure 4:
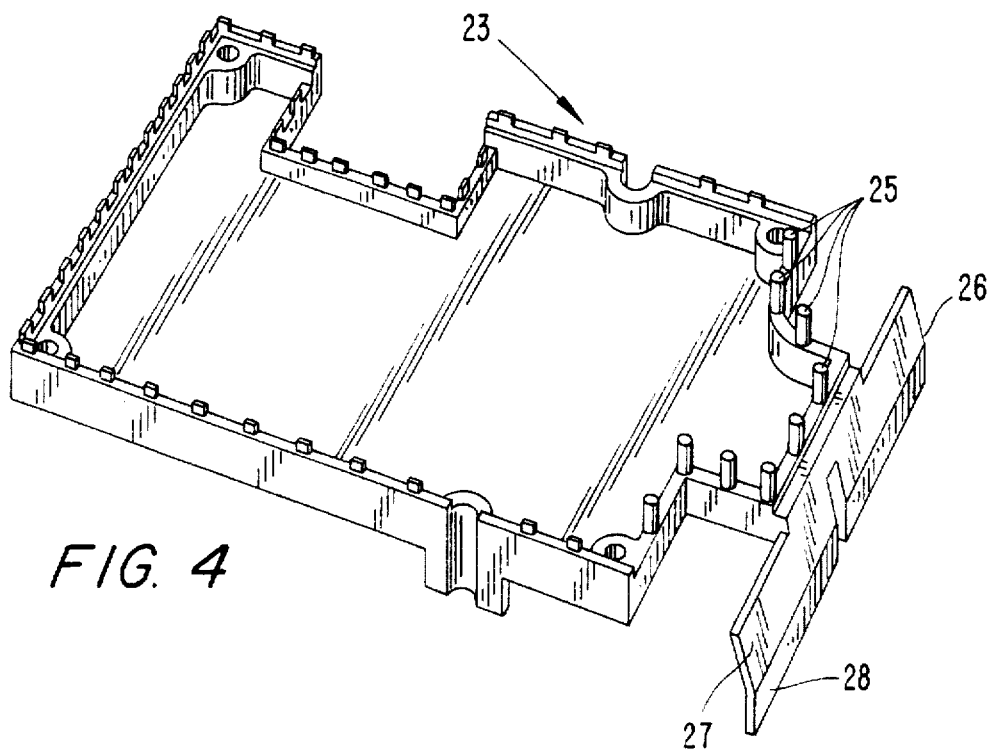
FIG. 4 shows schematically and in perspective another view of a part of the antenna construction used in FIG. 3.

FIG. 4 shows the shielding 23 with the plate 26 from the open side thereof. It is apparent that the peripheral form of shielding 23 corresponds with the form of the contour 22. In order to connect the shielding 23 to the contour 22 on PCB 21 the former is provided with pins 25 which correspond in location with holes 24 in the contour 22. The pins can be joined to the contour by soldering. Other connecting techniques are of course also possible, such as for instance the use of pins 25 with retention action in combination with plated-through holes 24.

In the embodiment shown the antenna signal conductor 13 extends through the PCB 21 from the one to the other side thereof for connection to the radio transmission means 12. In the configuration wherein the contour 22 extends on both sides of PCB 21 the antenna signal conductor 13 must of course be free of conducting contact with the contour and the mass means. To this end use can be made of an additional separate conductor, while there is also the possibility of embodying the PCB 21 in per se known manner in multiple layers, wherein the antenna signal conductor 13 is coupled via an intermediate layer to the radio transmission means 12. The location of conductors 14 and 18 on the one or other side of the PCB has no fundamental effect on the antenna operation.

Although FIG. 3 shows a slightly inclining plate 26 disposed on one side of PCB 21 in order to realize desired antenna directional properties, the invention is of course not limited thereto. The plate can for instance extend substantially transversely of the plane of PCB 21 or can have a shape curved in one or more directions. The plate can also extend on both sides of the PCB. The position and shape of the plate, as well as the construction of the radiating element of the antenna, contribute toward determining the eventual antenna directivity pattern.

FIGS. 7-11 show five different embodiments of the electrically conducting element of the antenna for transmitting and receiving radio signals, in the form of printed wiring on a PCB. The conducting surface is formed by a box-like shielding 29 in elevated position relative to the PCB All embodiments of the shown antennas can be dimensioned such that they are tuned for resonance at a frequency in the range of for instance 1.5–2.5 GHz, with optimum impedance matching of for instance 50 Ohm. These values are, however, only examples, wherein it is also quite possible to construct the antenna for higher and/or lower frequencies.

FIG. 7 shows the embodiment according to FIG. 3 with an elongate first conductor 14 and an elongate second conductor 18 extending transversely thereof in the middle.

FIG. 8 shows an embodiment with an elongate second conductor 30 which extends transversely of the first conductor 14 only on one side, which results in a generally L-shape.

FIG. 9 and 10 shows variants of the general T-shape of FIG. 7, wherein the extremities 33 and 34 of the second conductors 31 and 32 form respective angles of 45° and 90° with the longitudinal direction of the relevant conductors. It will be apparent that the straight lengths of the second conductors 18, 31 and 32 are mutually differing while the elements can nevertheless be tuned to the same frequency.

FIG. 11 shows a variant wherein the second conductor 35 has a closed O-shaped contour. Instead of a closed contour the second conductor can also have an open, generally C-shaped contour.

It is noted that the conductors 14, 18, 30, 31, 32 and 35 are not microstrip lines but only several wiring tracks on a plate of electrically insulating material (dielectric). Microstrip lines are characterized by an assembly of wiring tracks and an earthing surface or earthing track located a determined distance therefrom and separated by a dielectric.

In addition to the shown antenna means fixedly mounted in the telephone 1, the former can also be mounted outside the housing 2, wherein instead of wiring tracks on a PCB, wire-like conductors and the like can also be applied.

Although the invention is illustrated in the foregoing on the basis of an application in a portable cordless telephone, for example a telephone operating in accordance with the DECT-standard (Digital European Cordless Telecommunications), it is no sense limited thereto. The invention can be applied in a variety of cordless radio communication devices, irrespective of their function or the modulation technique etc. used.

We claim:

1. Antenna for use in a device for cordless radio communication, comprising:

at least one electrically conducting element for receiving and/or transmitting radio signals;

an electrically conducting surface which is disposed in the vicinity of the conducting element and interacts therewith and which, in the mounted situation, is connected to a common electrical mass means of the device, wherein the conducting element comprises a first electrical conductor with an end provided with a terminal for connection to electrical mass means of the device and with another end connected to a second electrical conductor, which second conductor extends substantially transversely from the first conductor, wherein the first conductor is provided in the region between said ends with a terminal for connection to radio transmission means of the device.

2. Device (1) according to claim 1, wherein the conducting element (14; 18; 30; 31; 32; 35) forms part of a printed circuit board (21).

3. Device (1) according to claim 2, wherein the conducting element (14; 18; 30; 31; 32; 35) is arranged near an edge of the printed circuit board (21).

4. Antenna according to claim 1, wherein the first and second conductors form part of a printed circuit board.

5. Antenna according to claim 1, wherein the conducting surface is formed by electrically conducting shielding means arranged in the device, including the shielding means of individual components of the device.

6. Antenna according to claim 1, wherein the conducting surface and the said conducting element are accommodated fixedly in a housing enclosing the device.

7. An antenna for use in a device for cordless radio communication comprising:
- a first electrical conductor connected at a first end to a conductive surface and having a second end;
- a second electrical conductor extending substantially transversely to said first electrical conductor and connected to said second end of said first electrical conductor; and
- a connection node, disposed between said first and second ends of said first electrical conductor, for connecting said antenna to a source.

8. The antenna of claim 7, wherein said conductive surface is adapted to generate a predetermined radiation pattern for electromagnetic energy which emanates from said antenna, said radiation pattern attenuating said electromagnetic energy emanating in a direction of a user of said antenna.

9. A remote unit comprising:
- a housing enclosing radio signal processing circuitry which provides signals for transmission to a source node;
- an antenna including:
  - a first electrical conductor having a first end and a second end;
  - a second electrical conductor extending substantially transversely to said first electrical conductor and connected to said second end of said first electrical conductor; and
  - a connection node, disposed between said first and second ends of said first electrical conductor, for connecting said antenna to said source node;
- wherein said housing includes a shielding portion connected to said first end of said first electrical conductor, said shielding portion adapted to attenuate electromagnetic transmissions emanating from said antenna in a direction of a user of said remote station.

10. The remote unit of claim 9, wherein said shielding portion does not substantially surround said antenna.

* * * * *